UNITED STATES PATENT OFFICE.

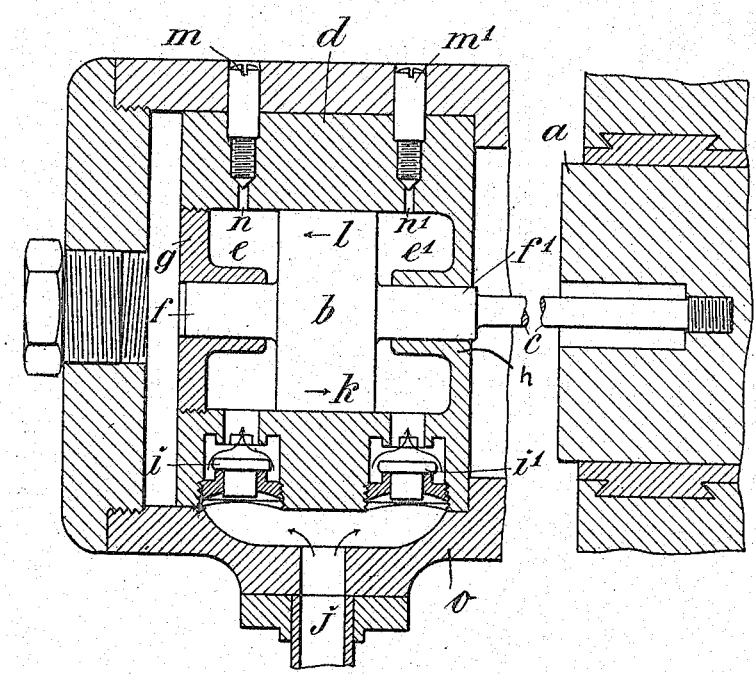

FREDRIK LJUNGSTRÖM, OF STOCKHOLM, SWEDEN, ASSIGNOR TO AKTIEBOLAGET LJUNGSTRÖMS ÅNGTURBIN, OF LILJEHOLMEN, SWEDEN.

LATERAL FLUID-SUPPORT FOR TURBINE-SHAFTS.

1,129,409.

Specification of Letters Patent.

Patented Feb. 23, 1915.

Application filed July 26, 1913. Serial No. 781,363.

*To all whom it may concern:*

Be it known that I, FREDRIK LJUNGSTRÖM, citizen of Sweden, residing at 2 Drottningholmsvägen, Stockholm, Sweden, have invented certain new and useful Improvements in Lateral Fluid-Supports for Turbine-Shafts, of which the following is a specification.

In steam or gas turbines, especially those which are provided with automatically acting balancing devices to take up the axial pressure, vibrations of the shaft in the longitudinal direction are experienced. To avoid this oil brakes or checks are used.

The invention relates to such a device and has for its object to avoid the entrance of air in the oil chamber, as such entrance would interfere with the action of the oil.

The invention is illustrated in longitudinal section in the annexed drawing in which:—

$a$ indicates the turbine shaft, connected with the turbine, $b$ indicates a piston, arranged in a cylinder $d$ and connected with shaft $a$ by means of the yielding shaft $c$.

The oil cylinder $d$ contains the suction and pressure chambers $e$ and $e^1$, through which the stems $f$, $f^1$ of the piston pass. These stems are mounted with a slight play in the cylinder cover and the cylinder bottom $h$.

The chambers $e$ and $e^1$ are connected by means of the suction valves $i$ and $i^1$ with the oil supply tube $j$, which preferably is connected with the lubricating pump of the turbine or any other pressure device. The tube $j$ may, however, also be connected to any suitable receiver.

In the event of longitudinal vibrations being transmitted to the turbine shaft these vibrations will be transferred by means of the shafts $a$ and $c$ to the piston, and at each movement of the piston $b$ in the direction $l$ oil is sucked through $i^1$ into $e^1$, while when the piston is displaced in the other direction $k$ oil is sucked into $e$ through $i$. Air thus never can be sucked around the stems $f$, $f^1$ and no air cushions interfering with or counteracting the braking effect can be formed.

The oscillations can only continue so long as the forces, producing them, are sufficiently great to force out again past $b$, $f$ and $f^1$ the oil sucked in, the greatest part of the oil being forced from the chamber $e$ into the chamber $e^1_1$ or vice versa.

The air which eventually finds its way with the oil into the chambers $e$ and $e^1$, together with any gases therein are forced inwardly by centrifugal force and collect around the stems $f$ and $f^1$. At each stroke of the piston the air and other gases are driven out.

The cylinder $d$ is preferably inclosed in the casing $o$, which in turn is connected with the turbine casing. The screws $m$, $m^1$ close the holes $n$, $n^1$, which when the oil is admitted to the device serve as air outlets.

The shaft $c$ is made yielding so that the piston $b$, independently of the radial vibrations of $a$, moves centrally in the cylinder $d$. Even in the event that $b$ is not entirely coaxial to the turbine shaft, no radial vibrations thus are transferred from $a$ to $d$. This is of great importance for the proper action of the device, because the guiding of the piston $b$ is effected by the stems, around which the air and the gases may escape.

Instead of oil any other fluid may be employed.

I claim:

1. A fluid device for the compensation of axial vibrations in gas or steam turbines, comprising a cylinder, a piston rotatable in said cylinder, pressure chambers provided in said cylinder on each side of said piston, and suction valves by means of which fluid can be supplied to said cylinders.

2. A fluid device for the compensation of axial vibrations in gas or steam turbines, comprising a cylinder, a piston rotatable in said cylinder, pressure chambers provided in said cylinder on each side of said piston, and suction valves by means of which fluid can be supplied to the cylinders, two stems being connected to said cylinder and loosely mounted so as to allow a certain amount of play.

3. A fluid device for the compensation of axial vibrations in gas or steam turbines, comprising a cylinder, a piston rotatable in said cylinder, pressure chambers provided in said cylinder on each side of said piston, and suction valves by means of which fluid can be supplied to the cylinders, the fluid supply being connected with a pressure pump.

4. A fluid device for the compensation of axial vibrations in gas or steam turbines comprising a cylinder, a piston rotatable in said cylinder, a yielding shaft connecting said piston to the source of power, pressure chambers provided in said cylinder on each side of said piston, and suction valves by means of which fluid can be supplied to said cylinders.

In testimony whereof I have affixed my signature in presence of two witnesses.

FREDRIK LJUNGSTRÖM.

Witnesses:
   HARRY ALBILIN,
   F. BERGMAN.